United States Patent [19]

Bacardit

[11] Patent Number: 4,665,798
[45] Date of Patent: May 19, 1987

[54] HYDRAULIC DISTRIBUTOR FOR A SERVO-MECHANISM WITH LIMITED REACTION ON THE INPUT MEMBER

[75] Inventor: Juan S. Bacardit, Barcelona, Spain

[73] Assignee: Bendiberica S.A., Barcelona, Spain

[21] Appl. No.: 557,564

[22] Filed: Dec. 2, 1983

[30] Foreign Application Priority Data

Dec. 11, 1982 [ES] Spain ............................ 518.114

[51] Int. Cl.⁴ .................................... F15B 9/10
[52] U.S. Cl. ............................ 91/371; 91/434; 137/625.21; 180/132
[58] Field of Search ............ 91/433, 434, 370, 371, 91/372, 373; 137/625.21; 180/132

[56] References Cited

U.S. PATENT DOCUMENTS

| | | | |
|---|---|---|---|
| 4,043,419 | 8/1977 | Larson et al. | 180/132 |
| 4,214,642 | 7/1980 | Dauvergne | 180/132 |
| 4,310,024 | 1/1982 | Bacardit | 137/625.21 |
| 4,320,812 | 3/1982 | Takaoka et al. | 180/143 |
| 4,356,759 | 11/1982 | Ljubimov et al. | 60/384 |

*Primary Examiner*—Edward K. Look
*Attorney, Agent, or Firm*—Larry J. Palguta; Ken C. Decker

[57] ABSTRACT

The distributor (10), typically with a star-shaped rotor in a discoid stator, comprises a reaction device (11) advantageously integrated in the distributor and providing the actuating member (17) of the distributor with a reaction opposite to the actuating torque exerted on this actuating member and proportional to the power-assistance force supplied by a jack (12) controlled by the distributor (10). A regulating valve (30, 31) is associated with the reaction device (11), being typically located upstream of the latter, and is put into effect when the reaction force applied by the reaction device reaches a maximum predetermined value, in order to limit the reaction force to this predetermined value.

13 Claims, 4 Drawing Figures

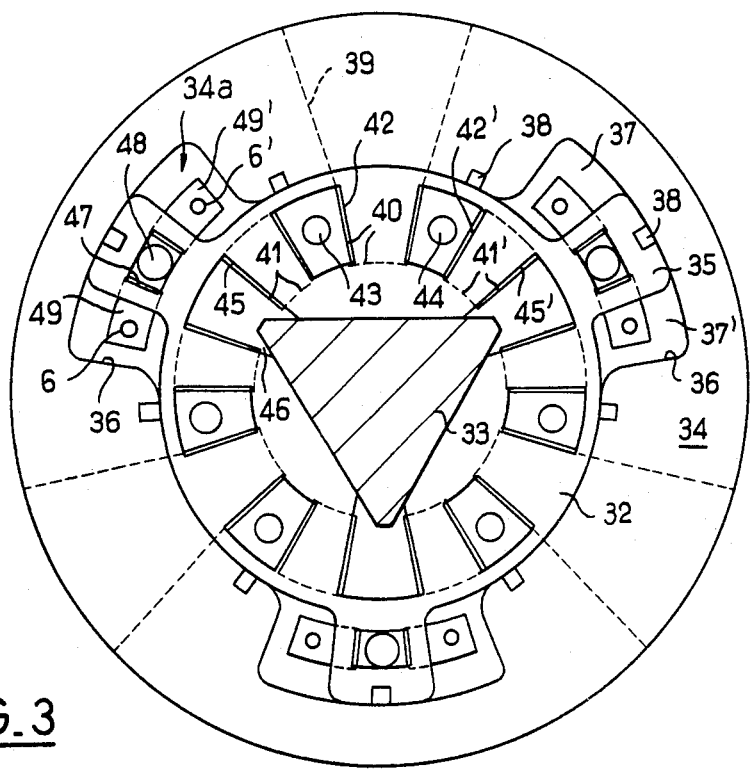
FIG_3
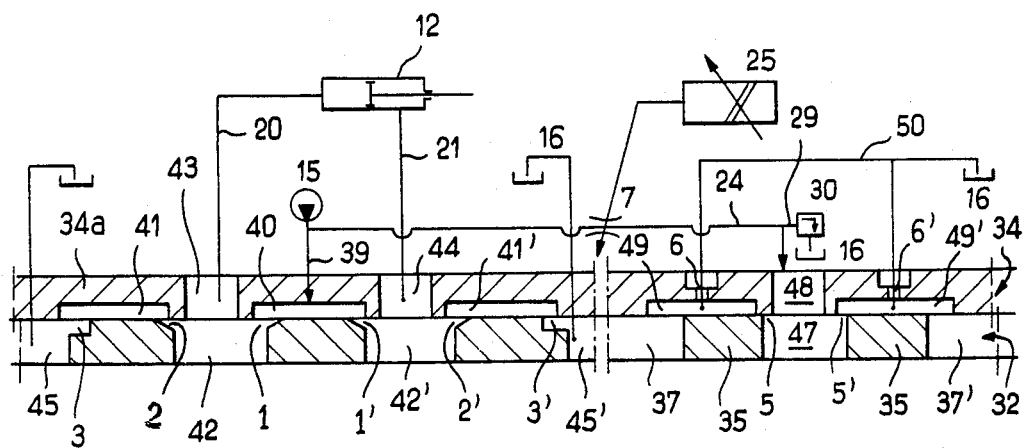
FIG_4

HYDRAULIC DISTRIBUTOR FOR A SERVO-MECHANISM WITH LIMITED REACTION ON THE INPUT MEMBER

The present invention relates to hydraulic distributors for servo-mechanisms, more particularly for the servo-assisted steering of a motor vehicle, of the type according to the pre-characterizing clause of Claim 1.

A distributor of this type is described in U.S. Pat. No. 4,512,238 in the Applicant's name. Such a distributor makes it possible to provide the operator (more specifically the driver) with information relating to the operating state of the circuit in the form of a reaction on the actuating input member, the operator having to overcome this reaction by applying a suitable actuating torgue. When such a distributor is used for actuating a power-assisted steering mechanism of a motor vehicle, the steering-wheel is therefore subjected to a reaction proportional to the force supplied by the power assistance, that is to say to the resistance opposed by the steering mechanism, which can, however, be adjusted by means of outside controls, such as, for example, an on-board computer, with which many modern vehicles are equipped, so as to adapt it to different operating or running conditions of the vehicle, so that, for example, this reaction is at a minimum when the vehicle carries out parking or low-speed maneuvers and so that it increases in a controlled manner in proportion as the speed of the vehicle increases. This variation is generally produced by means of a variable throttle valve controlled externally by an electromagnetic actuator controlled by the output or power circuits of the on-board computer. In practice, these devices can fail, and for reasons of safety the elements are designed in such a way that in the event of a breakdown the throttle valve tends to assume the position providing maximum reaction, so that driving continues in complete safety at high speed, but at the same time to the great detriment of the maneuvers for steering the vehicle at low speed or parking maneuvers, and therefore, in practice, nullifying the advantages of servo-assisted steering.

The object of the present invention is to solve this known problem of servo-assisted steering mechanisms and other servo-mechanisms conforming to the same characteristics, by proposing a distributor arrangement which is simple, of high performance, reliable and with low production costs.

For this purpose, according to a feature of the present invention, it incorporates, associated with the reaction device, regulating means which are actuated when the reaction force applied reaches a maximum predetermined value, in order to limit the reaction force to this predetermined value.

According to a more particular feature of the invention, the regulating means consist of a pressure-regulating valve loaded by a spring adjusted to a value corresponding to the maximum predetermined reaction force, this valve being inserted in the hydraulic circuit of the reaction device between the pressure source and the discharge.

Although it is technically possible to arrange such a valve for regulating and controlling the reaction downstream of each of the distribution valve means applying the reaction in the desired direction, it is preferable, according to the invention, to insert such a regulating and control valve upstream of the reaction device, that is to say at the common inlet of the distribution valve means, typically between these and a variable throttle controlled by the computer on board the vehicle and located between the reaction device and the source of fluid under pressure which likewise feeds the power-assistance jack via the hydraulic distributor.

Other features and advantages of the present invention will emerge from a reading of the following description of particular embodiments which is made with reference to the attached drawings in which:

FIG. 3 is a diagrammatic cross-sectional view of a servo-assisted steering control distributor with a star-shaped rotor according to the invention; and FIG. 4 is a partial laid out diagrammatic view of the distributor of FIG. 3.

Figure 1:
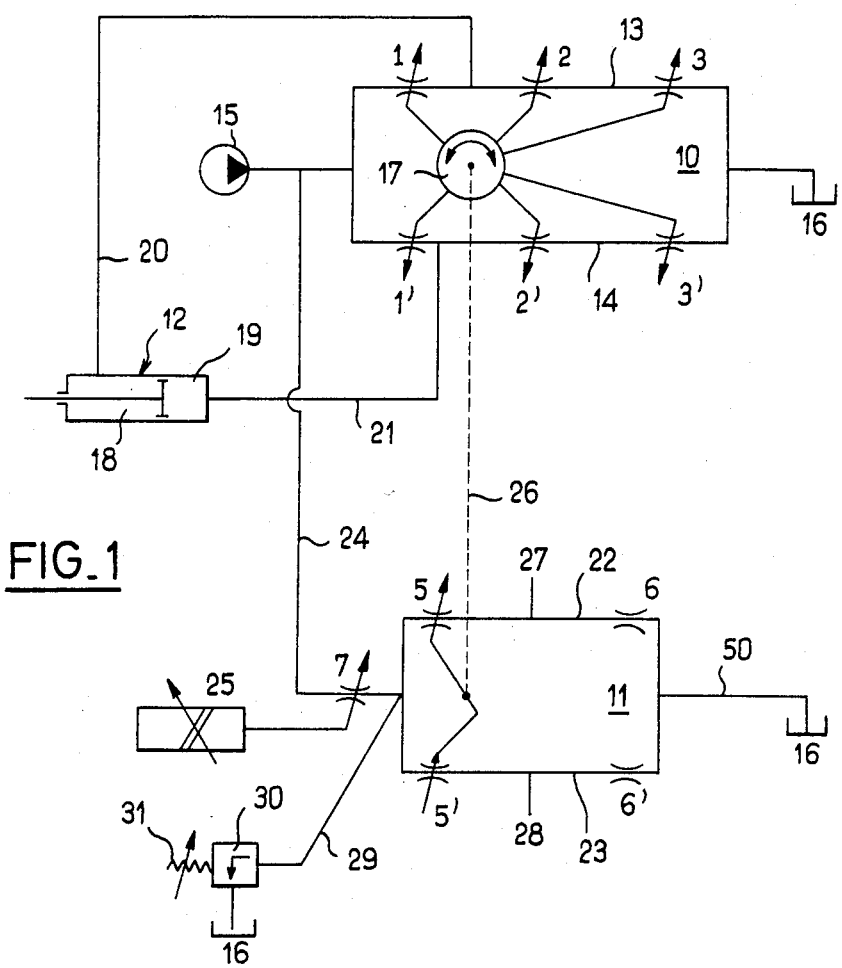
FIG. 1 is a functional diagram of a hydraulic distributor according to the invention.

FIG. 1 shows diagrammatically a hydraulic distributor 10 provided with a reaction control device 11 and serving for controlling a double-acting power-assistance actuator 12, for example for the power assistance of the steering mechanism of a vehicle.

The distributor 10 comprises, according to a known arrangement, two parallel circuits 13 and 14 which are located between a pressure source 15 (a hydraulic pump or any other device) and a discharge 16 and in each of which three throttle devices or adjustable restrictions 1, 2 and 3 and 1', 2' and 3', respectively, are connected in series in such a way as to be actuated simultaneously by the control member 17 of the distributor. The two working chambers 18 and 19 of the power-assistance actuator 12 are connected respectively by pipelines 20 and 21 to the portions of the circuits 13 and 14 located between the throttles 1 and 2 and 1' and 2'.

The reaction distributor system 11 likewise comprises two parallel circuits 22 and 23 between a pipe for the inflow of fluid under pressure 24, which is connected to the pressure source 15 and in which is inserted a variable outer throttle 7 controlled by an actuator 25 commanded by the on-board computer, and the discharge 16. Each of its circuits 22 and 23 is provided with two throttles in series 5, 6 and 5', 6', respectively. In the embodiment illustrated, the downstream throttles 6, 6' are fixed, whereas the upstream throttles 5, 5' are variable and are actuated, by means of a transmission shown at 26, from the control member 17 of the power-assistance control distributor 10.

It goes without saying that these arrangements of the circuits are merely symbolic and that, in practice, they can be adapted to all known embodiments in general use, such as, for example, a distributor assembly with a discoid stator and a star-shaped rotor, as described below with reference to FIGS. 3 and 4. In all cases, ducts connected to the reaction actuators, denoted by the reference numerals 27 and 28, extend respectively from the branches 22 and 23 of the reaction system 11 between the throttles 5, 6 and 5', 6'.

In the embodiment illustrated, at the inlet of the reaction system 11, that is to say downstream of the throttle 7 controlled by the on-board computer by means of the actuator 25, there is, according to the invention, a offtake 29 leading to the inlet of a pressure regulating or relief valve 30, the outlet of which ends at the discharge 16; this valve 30 is subjected to the stress of a spring 31, the force of which can be regulated so as to determine the maximum reaction desired.

Figure 2:
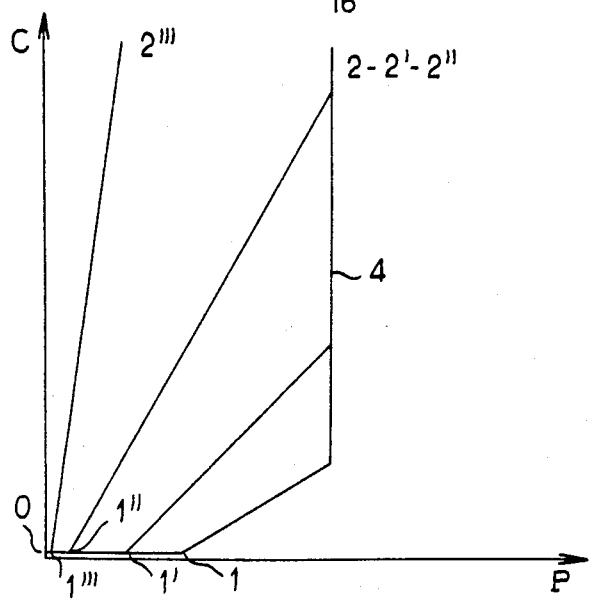
FIG. 2 shows a graph illustrating the reaction pressure P as a function of the torque C obtained by means of the system of FIG. 1.

The mode of operation will be understood easily from the drawings, if the following specific details are taken into account: the first throttles put into effect are the throttles 5 or 5' which perform a logic OR function by putting the system in a reaction state corresponding to the direction of rotation applied to the input control member 17, and then the throttle 2 or 2' is put into effect and causes an increase in the inlet control pressure in the distributor 10, but not in the power assistance force, given that the latter remains equal on both sides 18 and 19 of the power-assistance jack 12. The system is in the operating zone 0-1'''-1''-1'-1 of the characteristic of FIG. 2. The throttle 1 (or 1') subsequently comes into play, and this then increases the differential power-assistance pressure and the pressure at the inlet of the distributor so as to produce the reaction pressures corresponding to the direction of rotation selected. In this case, a mode of operation shown by the portions of characteristics 1-1'-1''-1''' of FIG. 2 is obtained, depending on the position of the throttle 7 determined by the on-board computer. On the other hand, the regulating valve 30 limits the reaction pressure to a specific value on the characteristic of FIG. 2 by means of the vertical line 4 which, while making it possible to use practically all the supply pressure in order to convert it into reaction pressure during driving at high speed, prevents the reaction pressure from exceeding a predetermined maximum value, even if the variable throttle 7 is kept wide open by means of the relay 25 so as to produce a reaction level higher than that corresponding to a specific running state, for example during parking maneuvers. When the force of the spring 31 is adjusted, the vertical line 4 will execute parallel translation in the graph of FIG. 2.

FIGS. 3 and 4 illustrate a practical use of the improvements which are the subject of the invention in a servo-assisted steering distributor with a discoid stator and a star-shaped rotor, such as that described, for example, in European Patent Application No. A-0 021 970 of the Applicant, and which comprises essentially a rotor 32 connected in rotation to the shaft 33 coming from the steering-wheel of a vehicle, and mounted in a stator 34 connected in a way not shown to the direction-changing mechanism of the wheels of the vehicle. The rotor 32 is provided with arms 35 accommodated in cavities 36 of the stator, so as to form on either side of each arm two opposing reaction chambers 37 and 37' which are limited axially by the two cover discs 34a which close the two faces of the stator; several gaskets, such as 38, isolate in a suitable way the various receptacles and passages formed in the assembly described above.

At least one of the covers 34a of the stator 34 is provided with radial grooves 39 which communicate with inlet cavities 40 of the distributor, the discharge cavities 41 and 41' of which are formed individually in the stator on both sides of each inlet cavity 40. The rotor 32 is provided with apertures 42 and 42' which, in the centered position of rest of the distributor, slightly overlap the adjacent ends of the cavities 40 and 41 or 41' respectively, between which are provided passages 43 and 44 which are connected to pipelines 20 and 21 ending at the respective chambers of the power-assistance jack 12. The discharge cavities 41 and 41' likewise partially overlap respectively two other apertures 45 and 45' of the rotor, which communicates with the discharge 16 via outlet passages which are provided in the central part of the distributor and of which only the radial grooves 46 in the rotor are shown in FIG. 3. On the other hand, each arm 35 of the rotor 32 is provided with a central aperture 47, while the covers 34a are equipped, opposite the relevant aperture 47, with an inlet orifice 48, connected to the pipeline 24 for the inflow of fluid under pressure and, on either side of the orifice 48, with two cavities 49 and 49' which communicate with the corresponding reaction chambers 37 and 37' and from which project discharge pipes 50 via calibrated passages constituting the fixed throttles 6 and 6' of FIG. 1.

FIG. 4 illustrates, laid out, the distributor with a star-shaped rotor of FIG. 3 and also reveals the regulating relief valve 30 and the variable throttle 7 controlled by the actuator 25.

The mode of operation of this distributor will be inferred clearly from the foregoing description.

I claim:

1. A hydraulic distributor for a servomechanism, more particularly for the servo-assisted steering of a motor vehicle, comprising, in first hydraulic circuit means between a source of fluid under pressure and a discharge, first distribution valve means for controlling an assistance hydraulic motor, said first distribution valve means actuatable by an input member of the distributor, a reaction device actuated hydraulically and coupled to the input member to exert on the input member a reaction force opposite to an actuating force exerted on the input member and proportional to an assistance force supplied by said assistance motor, said reaction device comprising, in second hydraulic circuit means between the pressure source and the discharge, second distribution valve means actuated in sequence by the input member of the distributor so as to supply selectively a reaction pressure generating said reaction force, and in a branch line between said second hydraulic circuit means and the discharge, hydraulic regulating means actuatable when the reaction force applied reaches a maximum predetermined value in order to limit the reaction force to said predetermined value.

2. The distributor of claim 1, wherein said branch line derives from said second circuit means upstream the reaction device.

3. The distributor of claim 2, further comprising an externally controlled variable throttle located in the second circuit means and upstream said branch line.

4. The distributor of claim 2, wherein said regulating means consists of a pressure regulating-valve loaded by a spring adjusted to a value corresponding to said maximum predetermined value of said reaction force.

5. The distributor of claim 4, wherein the second distribution valve means performs an OR logic function of preselecting a direction of the reaction force to be applied, and being actuated by the input member with a phase lead in relation to the first distribution valve means.

6. The distributor of claim 1, wherein said first distribution valve means is formed between a star-shaped rotor housed in a cavity and adjacent walls of said cavity, the rotor having radially extending arms.

7. The distributor of claim 6, wherein the reaction device includes at least one radially extending arm of the star-shaped rotor, the arm defining in said cavity two opposite reaction pressure chambers.

8. The distributor of claim 7, wherein said second distribution valve means is formed between said arms of said star-shaped rotor and said adjacent walls of said cavity.

9. A hydraulic control system for a servo-mechanism, comprising:
- parallel first and second fluid circuit means between a source of fluid under pressure and a discharge,
- a distributor having first valve means interposed in said first circuit means and actuatable by an input member for controlling an assistance hydraulic motor furnishing an assistance output force,
- a hydraulic reaction device having second valve means interposed in said second circuit means for controlling a reaction hydraulic motor operatively coupled to said input member, the second valve means actuatable in response to actuation of said input member of said distributor, the reaction hydraulic motor actuatable to exert on said input member a reaction force resisting an actuating force exerted on said input member for actuating said distributor, said reaction force proportional to the assistance output force in a limited range of the assistance output force,
- said second valve means being operatively coupled to said input member and actuatable in phase shift relative to actuation of said first valve means, and
- a pressure regulating device interposed in said second circuit means between said source of fluid under pressure and said second valve means, the pressure regulating device for limiting the reaction force exerted by said reaction hydraulic motor on said input member to a maximum predetermined value.

10. The control system of claim 9, wherein said distributor comprises at least two relatively movable distributor members, said reaction hydraulic motor formed by cooperating parts of said distributor member.

11. The control system of claim 9, wherein said distributor comprises a star-shaped rotor mechanically coupled to a rotating input member and having outwardly extending arms housed in a cavity of a stator assembly.

12. The control system of claim 11, wherein said first and second valve means are formed by radially offset cooperating portions of said arms and of said stator assembly.

13. The control system of claim 12, further comprising an externally controlled throttling means in said second circuit means between said source of fluid under pressure and said pressure regulating device.

* * * * *